United States Patent
Chase et al.

(10) Patent No.: US 10,909,591 B2
(45) Date of Patent: Feb. 2, 2021

(54) COMPUTER IMPLEMENTED SOFTWARE DEFINED NETWORK FOR DYNAMIC INFORMATION PROCESSING

(71) Applicant: SAP SE, Walldorf (DE)

(72) Inventors: Christopher Chase, Palo Alto, CA (US); Vijay Chandramouli, San Jose, CA (US); Xiangqun Hu, Palo Alto, CA (US); Pallav Gurha, Sunnyvale, CA (US); Samiran Saha, Sunnyvale, CA (US)

(73) Assignee: SAP SE, Walldorf (DE)

( * ) Notice: Subject to any disclaimer, the term of this patent is extended or adjusted under 35 U.S.C. 154(b) by 617 days.

(21) Appl. No.: 15/251,834

(22) Filed: Aug. 30, 2016

(65) Prior Publication Data
US 2018/0060971 A1    Mar. 1, 2018

(51) Int. Cl.
*G06Q 30/04* (2012.01)
*G06Q 40/00* (2012.01)
*G06Q 20/20* (2012.01)

(52) U.S. Cl.
CPC .......... *G06Q 30/04* (2013.01); *G06Q 20/207* (2013.01); *G06Q 40/10* (2013.01)

(58) Field of Classification Search
CPC ....... G06Q 30/04; G06Q 20/207; G06Q 40/10
See application file for complete search history.

(56) References Cited

U.S. PATENT DOCUMENTS

| | | | | |
|---|---|---|---|---|
| 6,993,502 B1* | 1/2006 | Gryglewicz | ......... | G06Q 20/207 705/19 |
| 2002/0184125 A1* | 12/2002 | Cirulli | ................. | G06Q 20/102 705/35 |
| 2003/0055754 A1* | 3/2003 | Sullivan | ................. | G06Q 30/02 705/31 |
| 2003/0093320 A1* | 5/2003 | Sullivan | ............... | G06Q 20/207 705/19 |
| 2006/0015419 A1* | 1/2006 | Graf | ....................... | G06Q 30/04 705/31 |
| 2006/0136309 A1* | 6/2006 | Horn | .................... | G06Q 10/087 705/26.8 |

(Continued)

OTHER PUBLICATIONS

Needleman, Ted, "Solving your latest headache; sales and use tax systems move front and center", Accounting Today 28(05) 26, May 1, 2014. (Year: 2014).*

(Continued)

*Primary Examiner* — Eric T Wong
(74) *Attorney, Agent, or Firm* — Fountainhead Law Group P.C.

(57) ABSTRACT

The present disclosure includes techniques pertaining to computer implemented systems and methods for dynamic information processing. In one embodiment, the present disclosure includes a computer-implemented method comprising receiving, in a software defined network, configuration information comprising one or more category codes and at least one location code corresponding to one or more transactions on the software defined network and receiving electronic documents having the same and different data fields. The configuration information is used to identify location specific mapping operators to transform input data to output data.

12 Claims, 9 Drawing Sheets

(56) References Cited

U.S. PATENT DOCUMENTS

2006/0242042 A1* 10/2006 Qin ..................... G06Q 20/207
705/35
2012/0323749 A1* 12/2012 Lapidus ................ G06Q 30/06
705/31

OTHER PUBLICATIONS

Anonymous, "SpeedTax, Inc.; SpeedTax and StrikeIron Partner to Provide Seamless e-Commerce Sales Tax Solutions", Information Technology Business [Atlanta], Apr. 21, 2009. (Year: 2009).*
Related to U.S. Appl. No. 14/981,658, filed Dec. 28, 2015, entitled "Automatic Reconciliation of Data Structures," by Chris Chase et al., not yet published.

* cited by examiner

| Tax Adjustment Configuration | | | | Done |
|---|---|---|---|---|
| CONFIGURE TAX ADJUSTMENT RULES | | | | |
| Add Tax Adjustment Rules | | | | |
| Rules | | | | |
| Tax Category ↑ | Tax Location Code | Created By | | Status |
| ○ PST | CA-MB | Aleksandra Wozniak | | Active |
| ○ PST | CA-SK | Aleksandra Wozniak | | Active |
| ○ VAT | GB | Aleksandra Wozniak | | Active |
| ○ VAT | ZA | Aleksandra Wozniak | | Active |
| ○ VAT | CH | Aleksandra Wozniak | | Active |
| Delete | | | | |

*FIG. 6A*

OK  Cancel

Configure tax adjustment rules to specify the tax category and tax location code for which it would be eligible for tax rebate.

Choose Tax Category: * PST ▽

Tax Location Code: * CA-BC

OK  Cancel

*FIG. 6B*

Payment Information

Payment Data: 8 Jun 2016
Payment Method: ACH
Invoice ID: INV119
Discount Basis: 1,000.00 CAD —— 650

Payment Proposal
6300000119 (Scheduling)
Original Amount: $1,120.00 CAD
Discount Amount: ($0.00 CAD)
Amount Due: $1,120.00 CAD
Settlement on 8 Jun 2016

Tax Detail Information

| Tax Category ↑ | Tax Location | Tax Amount | Tax Adjustment Amount |
|---|---|---|---|
| GST | CA | $50.00 CAD | NA |
| PST | CA-BC | $70.00 CAD | |

—— 655

Discount Information

Select the date on which you want to be paid

Page 1 ∨  »

| | Payment Date ↑ | Settlement Date | Scheduled Payment Date | Discount % | Tax Adjustment Amount | Discount Amount | Settlement Amount |
|---|---|---|---|---|---|---|---|
| ○ | 16 May 2016 | 17 May 2016 | 8 June 2016 | 2.20 | $1.54 CAD | $22.00 CAD | $1,096.46 CAD |
| ○ | 17 May 2016 | 18 May 2016 | 8 June 2016 | 2.10 | $1.47 CAD | $21.00 CAD | $1,097.53 CAD |
| ● | 18 May 2016 | 19 May 2016 | 8 June 2016 | 2.00 | $1.40 CAD | $20.00 CAD | $1,098.60 CAD |
| ○ | 19 May 2016 | 20 May 2016 | 8 June 2016 | 1.90 | $1.33 CAD | $19.00 CAD | $1,099.67 CAD |
| ○ | 20 May 2016 | 21 May 2016 | 8 June 2016 | 1.80 | $1.26 CAD | $18.00 CAD | $1,100.74 CAD |
| ○ | 24 May 2016 | 25 May 2016 | 8 June 2016 | 1.40 | $0.98 CAD | $14.00 CAD | $1,105.02 CAD |
| ○ | 25 May 2016 | 26 May 2016 | 8 June 2016 | 1.30 | $0.91 CAD | $13.00 CAD | $1,106.09 CAD |
| ○ | 26 May 2016 | 27 May 2016 | 8 June 2016 | 1.20 | $0.84 CAD | $12.00 CAD | $1,107.16 CAD |
| ○ | 27 May 2016 | 28 May 2016 | 8 June 2016 | 1.10 | $0.77 CAD | $11.00 CAD | $1,108.23 CAD |
| ○ | 30 May 2016 | 31 May 2016 | 8 June 2016 | 0.80 | $0.56 CAD | $8.00 CAD | $1,111.44 CAD |

651  652  653  654

Accept Early Payment Offer

*FIG. 6C*

COMPUTER IMPLEMENTED SOFTWARE DEFINED NETWORK FOR DYNAMIC INFORMATION PROCESSING

BACKGROUND

The present disclosure relates to computing and data processing, and in particular, to a computer implemented software defined network for dynamic information processing.

Computers and computer systems are being used to process information over an ever expanding range of applications that include more and more users every day. One challenge associated with processing information electronically is that computers have a difficult time dealing with unique requirements of each of the users, who may be spread out across many different geographic areas and have a wide range of unique requirements associated with transactions they are trying to perform. For example, computers are typically programmed to receive very precise inputs. If a user submits information to the computer for processing that does not match the inputs the computer is programmed to receive, then a processing error may occur. For computer systems that process inputs received from hundreds, thousands, or even tens of thousands of users, errors may occur if different users submit inputs unique to their requirements. To solve such problems, enormous programming efforts may be required to handle all the different use cases for a multitude of different user requirements.

One example instance of this problem is processing financial transactions, such as a sale between a buyer and a seller. In such cases, different transactions between buyers and sellers may invoke unique requirements specific to a particular buyer and/or a particular seller (e.g., tax implications and the like). Accordingly, processing information with unique user requirements is a technical computing problem in need of a solution.

SUMMARY

The present disclosure includes techniques pertaining to computer implemented systems and methods for dynamic information processing. In one embodiment, the present disclosure includes a computer-implemented method comprising receiving, in a software defined network, configuration information comprising one or more category codes and at least one location code corresponding to one or more transactions on the software defined network, receiving, in the software defined network, a plurality of electronic documents each comprising a plurality of data fields, wherein the plurality of electronic documents have a first plurality of data fields that are the same, and wherein the plurality of electronic documents have a second plurality of data fields that are different, accessing, in the software defined network, the configuration information, and in accordance therewith, identifying location specific mapping operators to transform input data in the plurality of data fields into output data, and executing, in the software defined network, the location specific mapping operators on the input data to produce output data.

In one embodiment, accessing the configuration information and executing the location specific mapping operators comprises, for a first electronic document, accessing a first category code and a first location code, performing a first location specific operation corresponding to the first category code and the first location code on a first data field of the second plurality of data fields, and for a second electronic document, accessing a second category code and a second location code, performing a second location specific operation corresponding to the second category code and the second location code on a second data field of the second plurality of data fields, where the first data field is not in the second electronic document and the second data field is not in the first electronic document.

In one embodiment, the location code specifies a location of a transaction from a predetermined set of locations.

In one embodiment, the locations are geographical regions.

In one embodiment, the category codes correspond to region specific operations performed on one or more of the data fields.

In one embodiment, the electronic documents are extended markup language (XML) documents.

In one embodiment, the XML documents comprise a data field in the first plurality of data fields storing a total amount due including tax, for a first XML document, a second data field in the second plurality of data fields storing a first category code corresponding to a first tax category, a third data field in the second plurality of data fields storing a first location code corresponding to a first tax location, and a fourth data field in the second plurality of data fields storing a first discount basis, and for a second XML document, the second data field in the second plurality of data fields storing a second category code corresponding to a second tax category, the third data field in the second plurality of data fields storing a second location code corresponding to a second tax location, and the fourth data field in the second plurality of data fields storing a second discount basis.

In one embodiment, the method further comprises sending the output data to an enterprise resource planning (ERP) system.

In one embodiment, the software defined network stores a plurality of category codes and a plurality of location codes as user specified tuples, each tuple comprising one category code and an associated one location code.

The techniques disclosed herein may further be implemented on a computer system including one or more processors and a computer readable medium or stored as code on a computer readable medium.

The following detailed description and accompanying drawings provide a better understanding of the nature and advantages of the present disclosure.

BRIEF DESCRIPTION OF THE DRAWINGS

FIG. 6A illustrates an interface for selecting category codes and locations according to an embodiment.

FIG. 6B illustrates a user interface for associating category codes and locations according to an embodiment.

FIG. 6C illustrates a user interface for setting the sellers expectations.

DETAILED DESCRIPTION

Described herein are techniques for a computer implemented software defined network for dynamic information processing. The apparatuses, methods, and techniques described below may be implemented as a computer program (software or code) executing on one or more computers. The computer program may further be stored on a tangible non-transitory computer readable medium, such as a memory or disk, for example. A computer readable medium may include instructions for performing the processes described below. In the following description, for purposes of explanation, numerous examples and specific details are set forth in order to provide a thorough understanding of various inventive techniques. It will be evident, however, to one skilled in the art that the inventive techniques as defined by the claims may include some or all of the features in these examples alone or in combination with other features described below, and may further include modifications and equivalents of the features and concepts described herein.

Figure 1:
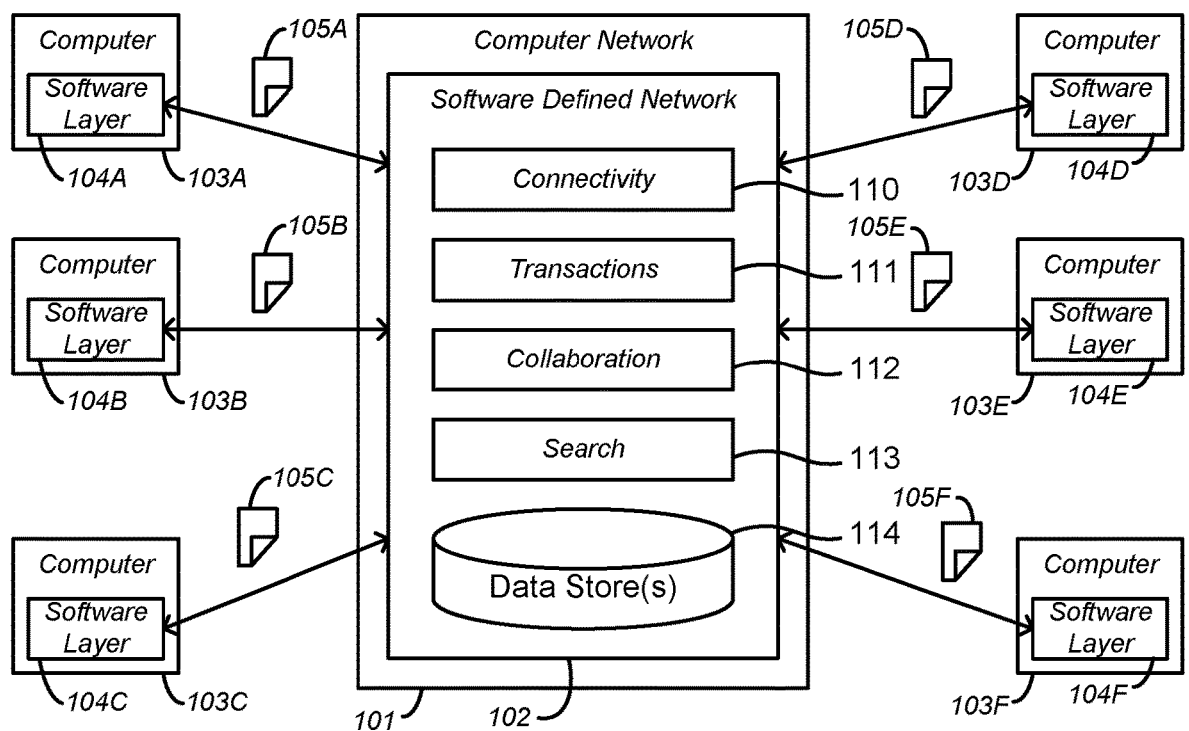
FIG. 1 illustrates a computer system including software defined network for dynamic information processing according to one embodiment.

FIG. 1 illustrates a computer system including software defined network for dynamic information processing according to one embodiment. A software defined network may be configured to establish connectivity between users of multiple different computer systems, for example, to perform transactions and/or collaboration between different users. In this example, software defined network 102 may execute on a computer network 101, which may be a cloud computer network, for example. Software defined network 102 may be in communication with multiple computers 103A-F. Computers 103A-F may each execute a software layer 104A-F. Software layers 104A-F may be configured to interface with software defined network 102, for example, to perform a wide variety of information processing functions. In some embodiments, information may be communicated back and forth between computers 103A-F and software defined network 102 using electronic documents 105A-F. In this example, software defined network 102 includes functional blocks (e.g., code blocks, modules, objects, or the like) which may include, for example, a connectivity unit 110 to coordinate connections with computers 103A-F and software layers 104A-F, one or more transactions units 111 to implement a wide variety of possible transactions on data with computers 103A-F, collaboration unit 112 to establish collaboration tools that allow different users to exchange and share information, a search unit 113 to allow users to search for information across the software defined network 102, and one or more data stores 114 (e.g., databases, data warehouses, or the like) to store information received in or generated by software defined network 102. One example software defined network embodying some or all of the features disclosed herein is the Ariba® Network from Ariba®, a company of SAP® SE.

Figure 2:
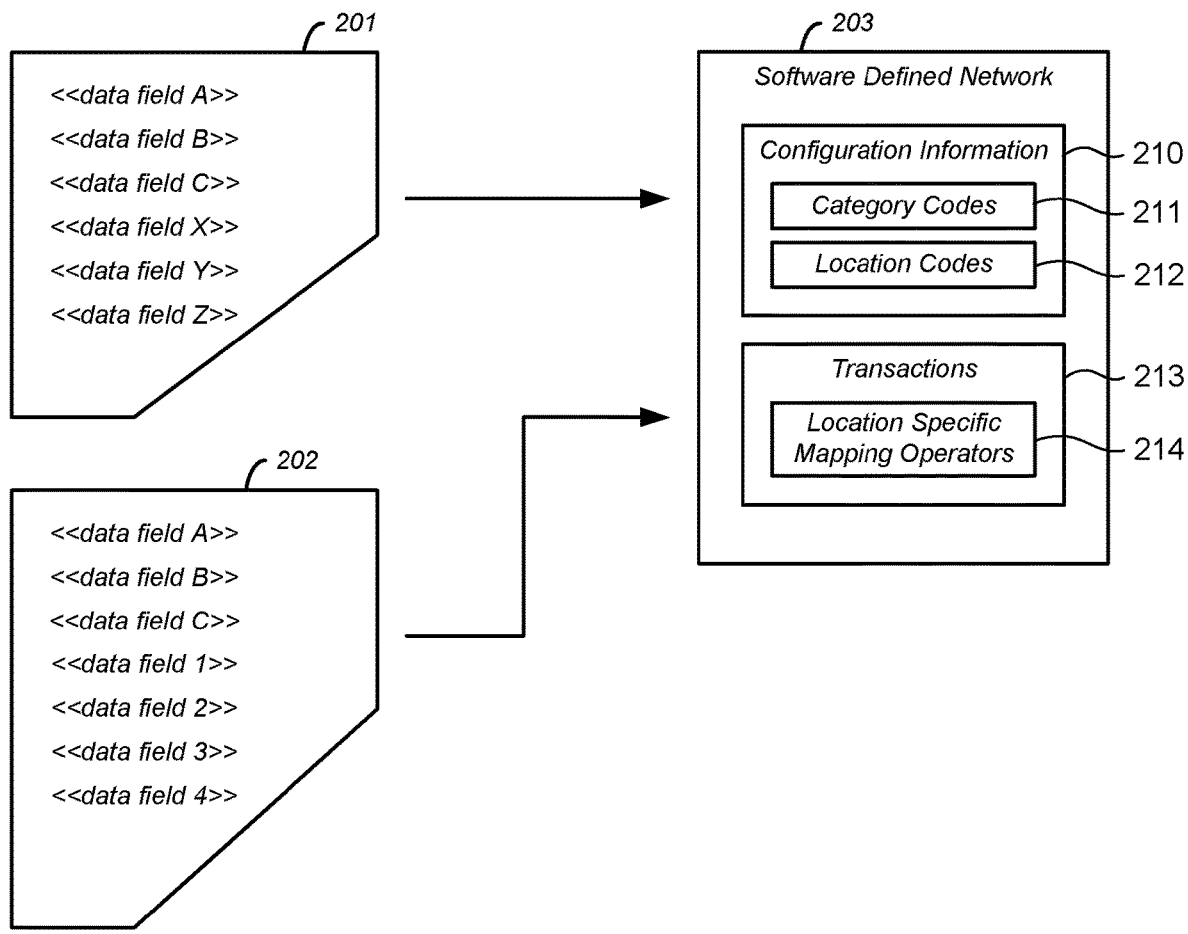
FIG. 2 illustrates dynamic document processing according to an embodiment.

FIG. 2 illustrates dynamic document processing according to an embodiment. Features and advantages of the present disclosure include a software defined network configured to dynamically processes electronic documents having some data fields in common and other data fields that are different (e.g., unique to particular users). As illustrated in FIG. 2, two different electronic documents 201 and 202 are receive in software defined network 203. Electronic documents 201 and 202 each comprise a plurality of data fields. For example, electronic document 201 includes data fields A, B, C, X, Y, and Z. Similarly, electronic document 202 includes data fields A, B, C, 1, 2, 3, and 4. From this example it is evident that document 201 and document 202 have data fields A, B, and C in common (i.e., the same data fields are in both documents). However, each document may have data fields that are unique to particular systems or users. In this case, document 201 includes data fields X, Y, and Z, which are not in document 202. Similarly, document 202 includes data fields 1, 2, 3, 4, which are not in document 201. Accordingly, aspects of the disclosure include processing a plurality of electronic documents, in this case documents 201 and 202, having a first plurality of data fields that are the same and a second plurality of data fields that are different.

To receive electronic documents having different data fields as well as common data fields, embodiments of the present disclosure advantageously store configuration information that may be used to dynamically process different electronic documents from different users, for example. Referring again to FIG. 2, software defined network 203 may include configuration information 210 to dynamically process electronic documents having different data fields. In one embodiment, different documents may be associated with systems or users from different locations, which results in different documents having different fields that required different algorithms for successful processing. Accordingly, configuration information 210 may include category codes 211 and location codes 212. Category codes 211 and location codes 212 may correspond to particular processing steps to be performed on data in data fields unique to a particular category of transactions and a specific location, for example. In one embodiment, configuration information 210 is received in the software defined network 203 prior to reception of an electronic document. The configuration information 210 may include one or more category codes 211 and at least one location code 212 corresponding to one or more transactions 213 on the software defined network 203. Software defined network 203 may be configured to perform a wide range of transactions 213. In this example, transactions 213 include location specific mapping operators 214.

When electronic documents are received, the software defined network 203 may access the configuration information 210, and in accordance therewith, identify particular location specific mapping operators 214 to transform input data in the plurality of data fields into output data, for example. Location specific mapping operators 212 may include a wide range of operations that may vary across locations or regions (e.g., regional sales tax calculations, regional value added tax (VAT) calculations, or more complex location based determinations). Once the mapping operators are identified, the software defined network executes the location specific mapping operators on the input data to produce output data.

Figure 3:
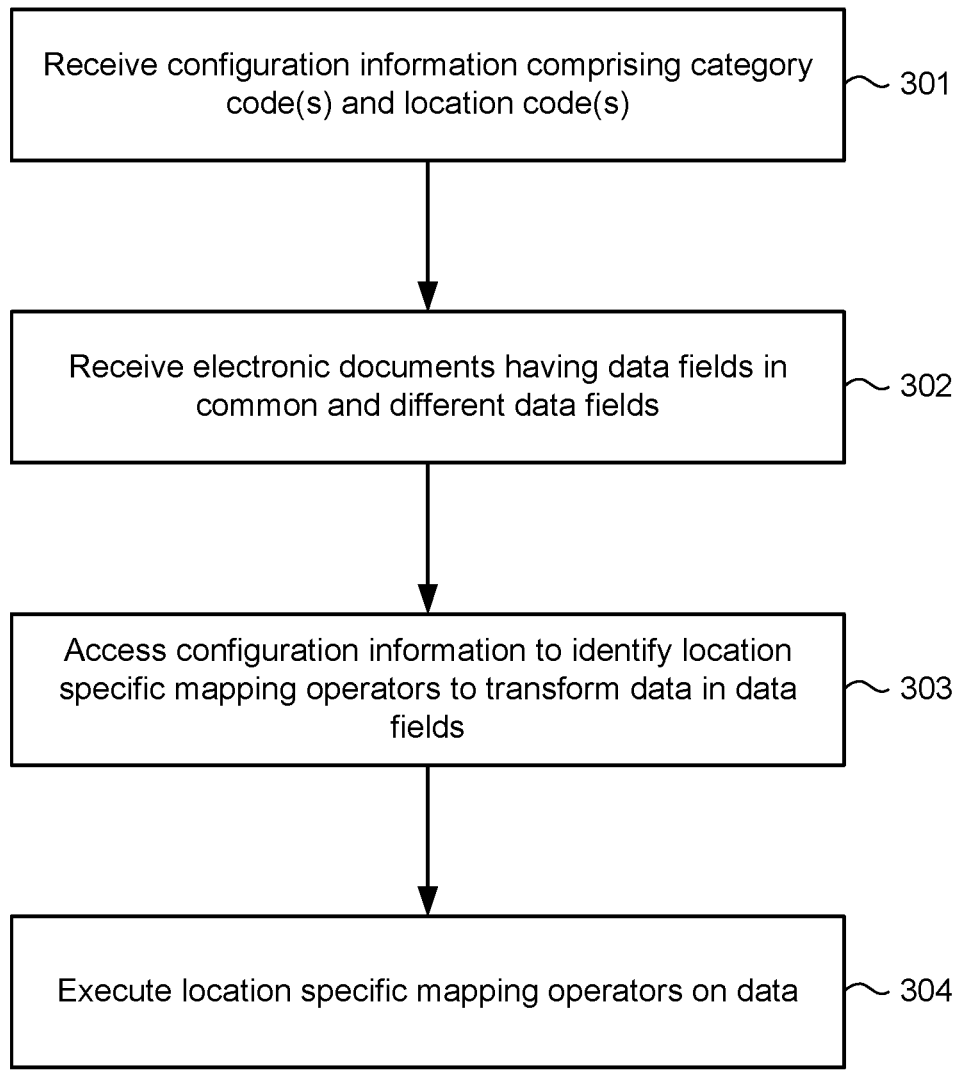
FIG. 3 illustrates a method of dynamic information processing according to an embodiment.

FIG. 3 illustrates a method of dynamic information processing according to an embodiment. At 301, a software defined network receives configuration information comprising one or more category codes and at least one location code corresponding to one or more transactions on the software defined network. In one embodiment, the location code(s) may specify a location of a transaction from a predetermined set of locations, for example. The locations may be geographic regions, such as cities, counties, states, provinces, countries, or other geographic delineations, for example. The category codes may correspond to region specific operations performed on one or more of the data fields, for example (e.g., local regional taxes). At 302, the software defined network receives a plurality of electronic documents each comprising a plurality of data fields. In one example embodiment, the electronic documents are extended markup language (XML) documents. The plurality of electronic documents have a first plurality of data fields that are the same and a second plurality of data fields that are different. At 303, the software defined network accesses the configuration information, and in accordance therewith, identifies location specific mapping operators to transform input data in the plurality of data fields into output data. At 304, the software defined network executes the location specific mapping operators on the input data to produce output data.

Advantageously, different documents with different data fields may be processed to produce results. For example, in one embodiment, accessing the configuration information and executing the location specific mapping operators may occur as follows. For a first electronic document, a first category code and a first location code are accessed. Next, a first location specific operation corresponding to the first category code and the first location code is performed on a data field that may not be shared by other documents (e.g., the data field may be specific to the location). For a second electronic document, a second category code and a second location code are accessed. A second location specific operation corresponding to the second category code and the second location code is performed on a second data field, where the first data field is not in the second electronic document and the second data field is not in the first electronic document.

Example

Particular embodiments of the present disclosure may be used in a wide range of information processing applications. The following is just one example application of the inventive techniques described herein.

Figure 4:
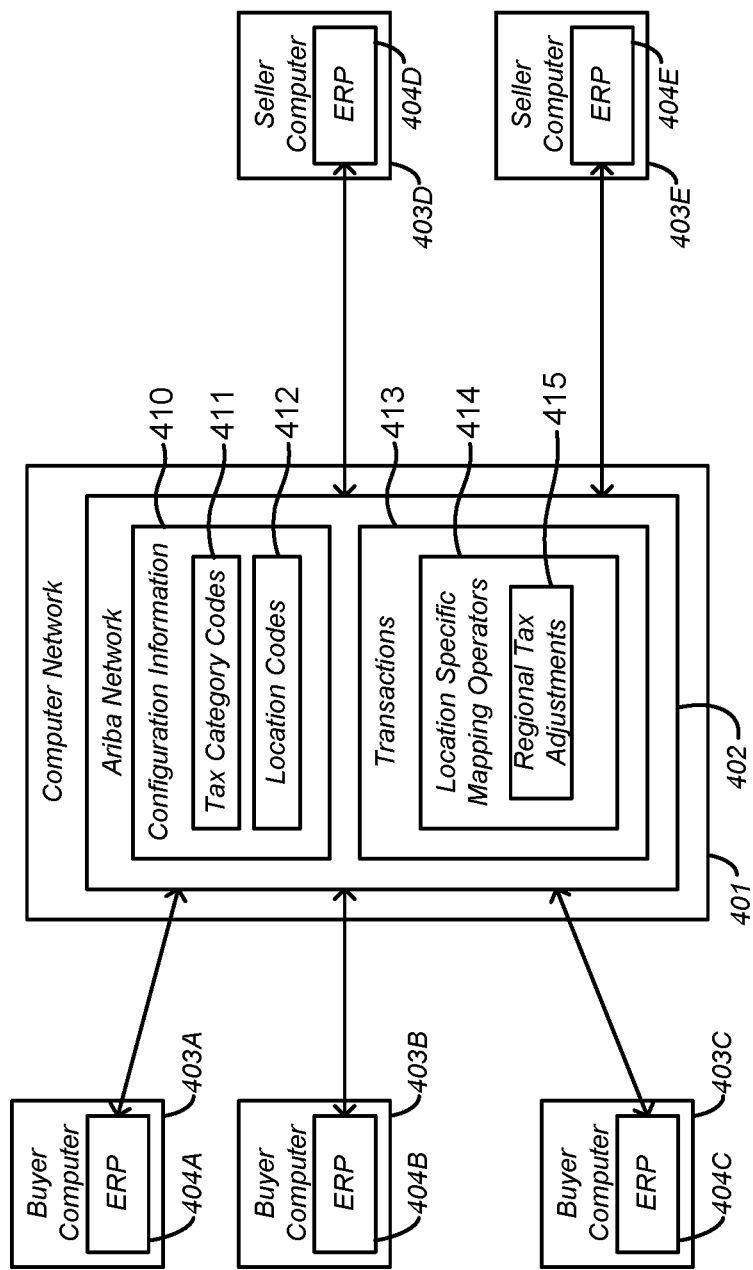
FIG. 4 illustrates an example network configured for dynamic information processing according to an embodiment.

FIG. 4 illustrates an example network configured for dynamic information processing according to an embodiment. In this example, the software defined network is the Ariba® Network 402 from Ariba®, a company of SAP® SE. The Ariba® Network is a cloud-based network that connects buyers and suppliers through a Software-as-a-Service (Saas)-based e-commerce platform, which may extends to virtually any back-end system for business commerce collaboration. Network 402 may operate on a cloud computer network 401 comprising multiple server computers, for example. In this example, network 402 may communicate information to and from enterprise resource planning (ERP) software layers 404A-E on computers 403A-E. In one embodiment, computers 403A-C may be computers of buyers and computers 403D-E may be computers of sellers. It is to be understood that network 402 may communicate with a variety of different ERP systems or computers without an ERP system, for example.

One particular transaction that may be advantageously performed using techniques described herein is a transaction involving discounts in different regions having one or more local or regional taxes. For instance, a buyer may request a discount if the buyer agrees to pay the seller within a particular time frame (e.g., a 2% discount if an invoice is paid within 10 days). Some buyers may offer dynamic discounting which may give larger discounts for earlier payments and lower discounts for later early payments (e.g., where a discount decreases as a payment due date gets closer). For buyers and sellers with large numbers of transactions, processing all this information and keeping track of taxable and non-taxable amounts across locations with different rules can be computationally challenging. One particular problem with discounting is that companies may exclude tax from certain discount calculations. For example, a seller in one region with one tax may be entitled to a tax adjustment for a discount that is different from a tax adjustment for a discount entitled to a seller in another region. Different regional tax types can be a challenge for certain ERP systems to reconcile and may cost sellers large amounts of money for many transactions in taxes they should not have to pay. Features and advantages of the present embodiment in FIG. 4 allow a seller (or the buyer) to enter configuration information 410 into network 402 including tax category codes 411 and location codes 412 (e.g., prior to the transactions). As transactions occur, electronic documents with transaction information may be processed quickly and seamlessly and generate adjustments for different taxes in different locations for different users and different discount amounts, for example. The regional tax adjustments 415 are included as operators 414 in network 402 and may be implemented using different calculations invoked based on the tax category codes 411 and locations codes 412 for each transaction, for example.

Figure 5:
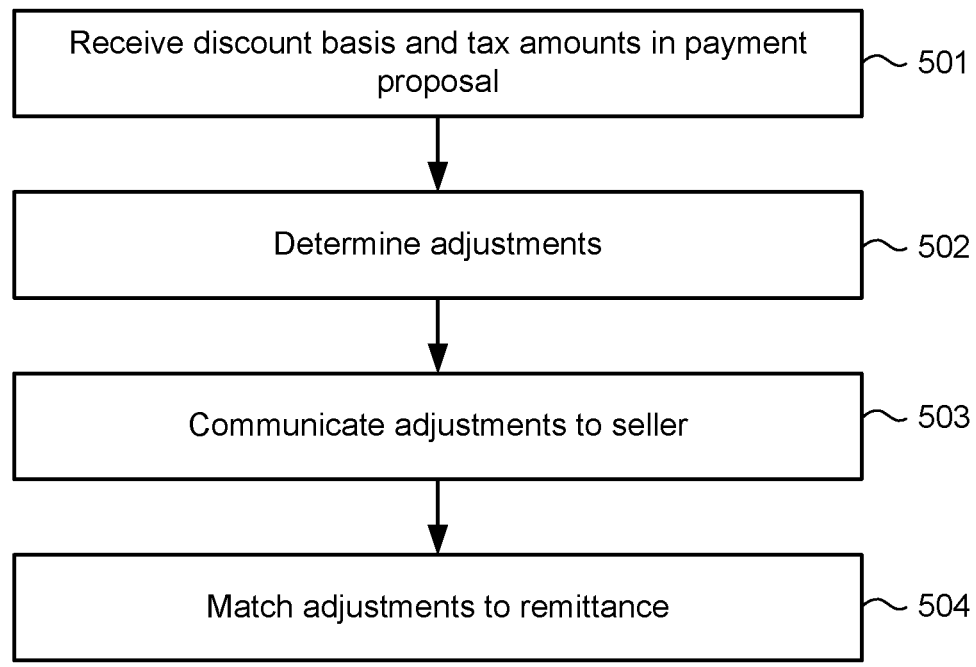
FIG. 5 illustrates a process according to an embodiment.

FIG. 5 illustrates a process according to an embodiment. In one embodiment, a buyer's ERP system may send a discount basis and tax amounts on approved invoices to network 402. A discount basis may be the amount of the goods or services purchased, excluding taxes. For example, a buyer's ERP may send a payment proposal to network 402. The discount basis and tax amounts are received in network 402 at 501. The following is an example extended markup language (XML) document for a payment proposal:

```
<DiscountBasis>
    <Money currency="CAD">1000</Money>
</DiscountBasis>
<Tax>
    <Money currency="CAD">1120</Money>
    <Description xml:lang="en">Tax Summary</Description>
        <TaxDetail category="gst" purpose="tax">
            <TaxableAmount><Money currency="CAD">1000</Money>
    </TaxableAmount>
            <TaxAmount> <Money currency="CAD">50</Money> </TaxAmount>
                <TaxLocation xml:lang="en">CA</TaxLocation>
            <Description xml:lang="en">Goods and Services Tax</Description>
        </TaxDetail>
        <TaxDetail category="pst" purpose="tax">
            <TaxableAmount><Money currency = "CAD">1000</Money>
```

```xml
</TaxableAmount>
    <TaxAmount><Money currency="CAD">70</Money></TaxAmount>
<TaxLocation xml:lang="en">CA-BC</TaxLocation>
        <Description xml:lang="en">Provincial Services Tax</Description>
    </TaxDetail>
</Tax>
```

The above XML document includes location codes for Canada (CA) and Canada-British Columbia (CA-BR) as well as tax category codes "gst" (i.e., "Goods and Services Tax") and "pst" ("Provincial Services Tax").

FIG. 6A illustrates a buyer's configuration of which combinations of tax categories and tax location requires a tax adjustment. In this example, a buyer may select PST as the tax category and CA-BC as the tax location code. Tax category codes may be associated with different location codes as illustrated in FIG. 6B, for example. In FIG. 6B, the system stores the category codes and the location codes as tuples (e.g., (x,y)), each tuple comprising a category code and an associated location code. In this example, this information may be used by network 402 to determine tax adjustments for particular transactions, for example. Referring again to FIG. 5, tax adjustments are determined at 502. For example, the tax category code "gst" and location code CA may be used to map the input data to produce a tax adjustment using an operation based on calculating a goods and services tax, for example. Other tax category codes and location codes may trigger other operations corresponding to other applicable tax calculations, for example, to produce location specific tax adjustments. The adjustments are communicated to the seller at 503. The following transaction illustrates adjustments for one example transaction:

| | |
|---|---|
| 1000.00 CAD | Purchase amount of goods or service |
| 50.00 CAD | GST |
| 70.00 CAD | PST (British Columbia) |
| 1120.00 CAD | Total Invoice Amount |
| $1000.00 CAD | ERP Calculated Discount Basis |

Dynamic Discount Offers to Suppliers

| Settlement Date | Discount % | Discount Amount (X % of discount basis) | Tax Adjustment (x % of PST (BC)) | Settlement Amount |
|---|---|---|---|---|
| 15 Aug. 2016 | 2.1% | 21.00 CAD | 1.47 CAD | 1097.53 CAD |
| 16 Aug. 2016 | 2.0% | 20.00 CAD | 1.40 CAD | 1098.60 CAD |
| 17 Aug. 2016 | 1.9% | 19.00 CAD | 1.33 CAD | 1099.67 CAD |

FIG. 6C illustrates a user interface for setting the sellers expectations. A seller may access the interface when connecting to network 402, for example. The interface shows the discount basis 650, discount percentage 651, tax adjustment 652, discount amount 653, settlement amount 654, and tax categories 655 for example, where the discount amount equals the discount basis multiplied by the discount percentage. A seller may select one of the payment date/discount offers and the system will automatically determine the amounts to be paid and tax adjustments due to the seller. Once a supplier makes a choice, an XML payment proposal may be passed back to the buyer's ERP. The new document may include any potential PST adjustment. The following is an example of tax adjustment information added to the XML document.

```xml
<TaxAdjustment>
    <Money currency="CAD">$1.40 CAD</Money>
        <AdjustmentDetail category="pst">
        <Money currency="CAD">$1.40 CAD</Money>
        </AdjustmentDetail>
</TaxAdjustment>
```

Referring again to FIG. 5, a remittance may be generated and matched against the adjustment information at 504. Advantageously, different sellers in different locations operating under different local, state, federal, provincial, or national taxes may all use different tax and location codes, which using the techniques described herein may support processing of different information in different documents to produce the desired results. As a particular example, different XML documents may be received for different transactions. Two XML different documents, for example, may include a data field storing a total amount due including tax. However, a first XML document may include a second data field storing a first category code corresponding to a first tax category, a third data field storing a first location code corresponding to a first tax location, and a fourth data field storing a first discount basis. The second XML document may include the second data field, but in this case such field may store a second category code corresponding to a second tax category, the third data field may store a second location code corresponding to a second tax location, and the fourth data field may store a second discount basis. In this context, the second, third, and fourth data fields refer to elements of different XML document containing data, but the field names, locations, and/or structures within the different XML documents may be different, for example. Accordingly, different data corresponding to different taxation operations/calculations may be received and processed by the Ariba network to generate tax adjustments for a wide range of transactions across different regions.

Example Hardware

Figure 7:
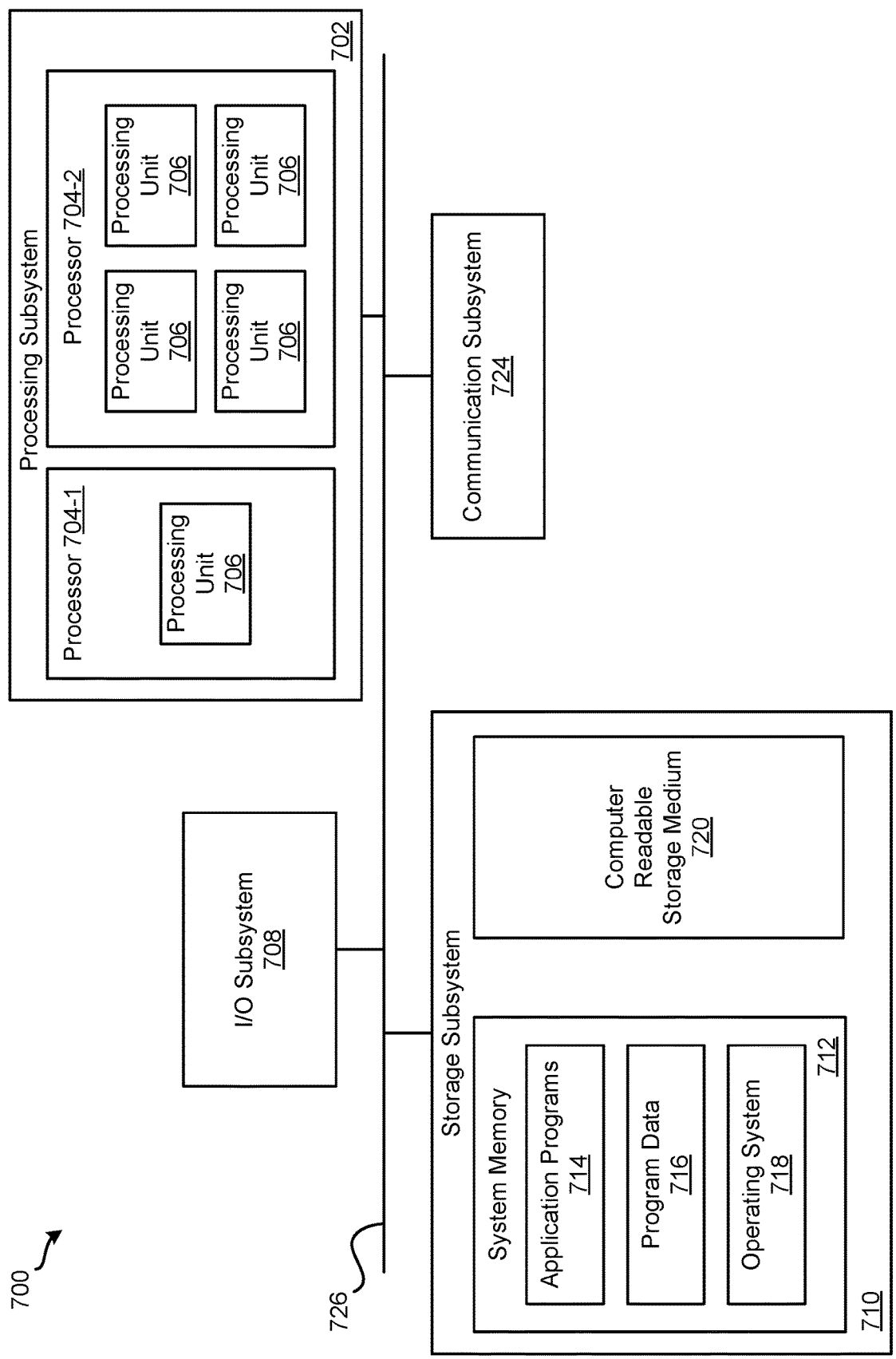
FIG. 7 illustrates an example computer system 700 according to an embodiment.

FIG. 7 illustrates an exemplary computer system 700, in which various embodiments may be implemented. For example, computer system 700 may be used to implement the techniques described above by reference to FIGS. 1-6C. Computer system 700 may be a desktop computer, a laptop, a server computer, or any other type of computer system or combination thereof. Some or all elements of network 102 can be included or implemented in computer system 700. In addition, computer system 700 can implement many of the operations, methods, and/or processes described above (e.g., processes of FIGS. 3 and 5). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrated into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712 and computer-readable storage medium 720. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., application software layers of FIG. 1), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., of network 102 of FIG. 1) and/or processes (e.g., processes of FIGS. 3 and 5) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Computer-readable storage medium 720, and optionally in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a communication network (described below), for example. Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
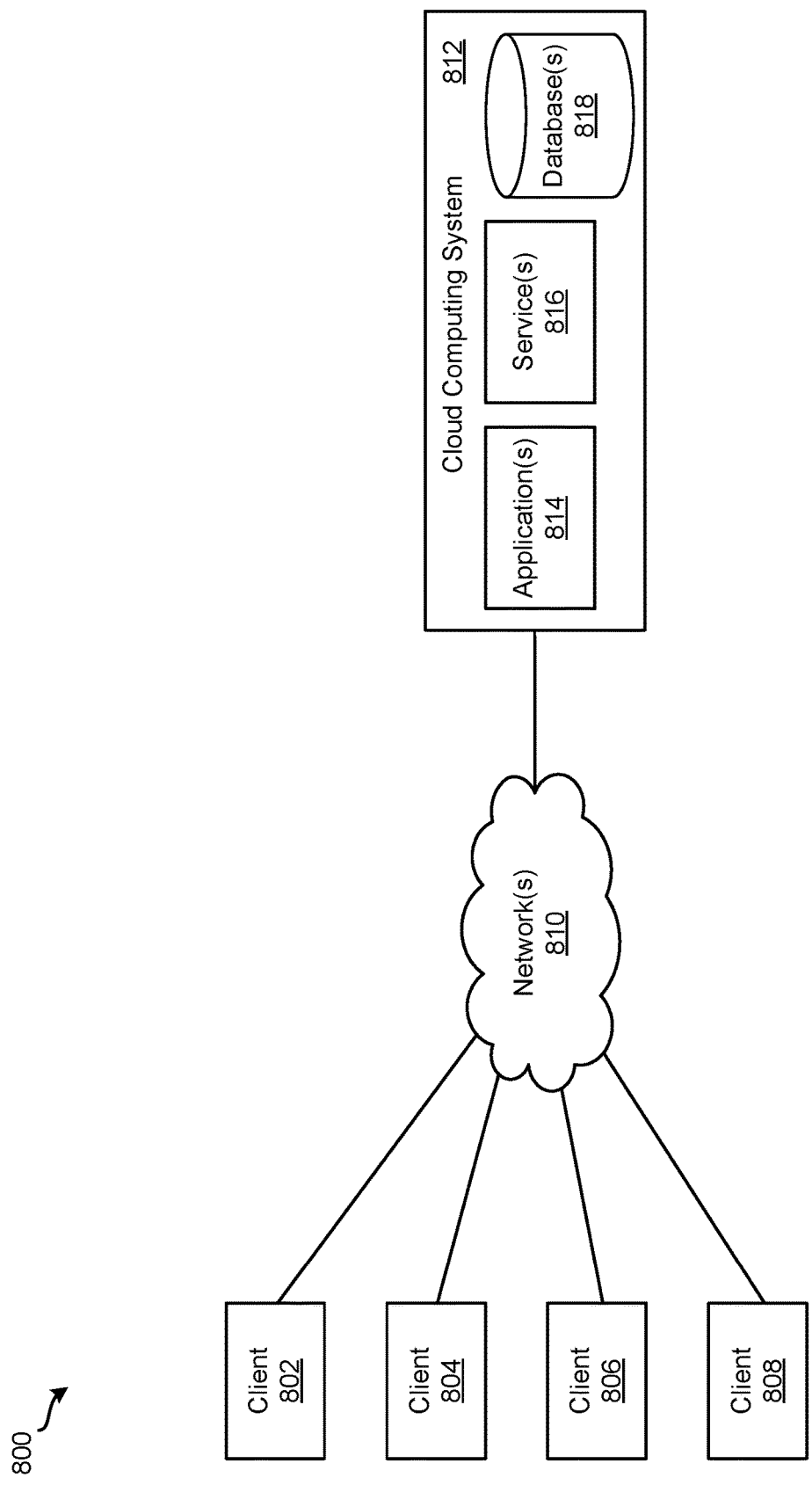
FIG. 8 illustrates cloud computer system according to an embodiment.

FIG. 8 illustrates system 800 for implementing various embodiments described above. For example, cloud computing system 812 of system 800 may be used to implement network 102 of FIG. 1. As shown, system 800 includes client devices 802-808, one or more communication networks 810, and cloud computing system 812. Cloud computing system 812 is configured to provide resources and data to client devices 802-808 via communication networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 may include one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models or when functionality is provided by a cloud computer system and local (or on premise, "on prem") servers together.

In some instances, any one of applications 814, services 816, and databases 818 made available to client devices 802-808 via communication networks 810 from cloud computing system 800 is referred to as a "cloud service." Typically, servers and systems that make up cloud computing system 800 are different from the on-prem servers and systems of a customer. For example, cloud computing system 800 may host an application, and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, applications, etc. that are configured to execute on cloud computing system 812 and provide functionalities to client devices 802-808 via networks 810. Services 816 may be web-based services or on-demand cloud services, for example.

Databases 818 are configured to store and/or manage data that is accessed by applications 814, services 816, and/or client devices 802-808. Databases 818 may reside on a non-transitory storage medium local to (and/or resident in) cloud computing system 812, in a storage-area network (SAN), or on a non-transitory storage medium located remotely from cloud computing system 812, for example. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. For example, data for databases 818 may be stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be a computer system 700 as described above with reference to FIG. 7, for example. Although system 800 is shown with four client devices, any number of client devices may be supported.

Communication networks 810 may be any type of network configured to facilitate data communications among clients devices 802-808 and cloud computing system 812 using any of a variety of network protocols. Communication networks 810 may include one or more of a personal area network (PAN), a local area network (LAN), a storage area network (SAN), a campus area network (CAN), a metropolitan area network (MAN), a wide area network (WAN), a global area network (GAN), an intranet, the Internet, or a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving, in a software defined network, configuration information comprising one or more category codes and at least one location code corresponding to one or more transactions on the software defined network, wherein the location code specifies a geographic region of a transaction from a predetermined set of geographic regions, and wherein the category codes correspond to region specific operations, and wherein the software defined network stores a plurality of category codes and a plurality of location codes as user specified tuples, each tuple comprising one category code and an associated one location code;
receiving, in the software defined network, a plurality of electronic documents each comprising a plurality of data fields, the data fields comprising a category code, a location code, and input data, wherein at least some of the plurality of electronic documents differ in which of the plurality of data fields the category code and the location code are held;
accessing, in the software defined network, the configuration information, and in accordance therewith, identifying location specific mapping operators for each electronic document based on each electronic document's category code and location code corresponding to specific ones of the user specified tuples for transforming the input data in the plurality of data fields into output data, the location specific mapping operators are configured to apply respective adjustments to the input data of the each electronic document for said transforming;
executing, in the software defined network, the location specific mapping operators on the input data to produce output data that reflects the respective adjustments; and
sending, by the software defined network to a client device, a communication based upon the output data indicating at least one of the respective adjustments.

2. The method of claim 1 wherein accessing the configuration information and executing the location specific mapping operators comprises:
for a first electronic document,
accessing a first category code and a first location code;
performing a first location specific operation corresponding to the first category code and the first location code on a first data field of the second plurality of data fields; and
for a second electronic document,
accessing a second category code and a second location code;
performing a second location specific operation corresponding to the second category code and the second location code on a second data field of the second plurality of data fields,
wherein the first data field is not in the second electronic document and the second data field is not in the first electronic document.

3. The method of claim 1 wherein the electronic documents are extended markup language (XML) documents.

4. The method of claim 3 wherein the XML documents comprise:
a data field in the first plurality of data fields storing a total amount due including tax;
for a first XML document,
a second data field in the second plurality of data fields storing a first category code corresponding to a first tax category;
a third data field in the second plurality of data fields storing a first location code corresponding to a first tax location; and
a fourth data field in the second plurality of data fields storing a first discount basis; and
for a second XML document,
the second data field in the second plurality of data fields storing a second category code corresponding to a second tax category;
the third data field in the second plurality of data fields storing a second location code corresponding to a second tax location; and
the fourth data field in the second plurality of data fields storing a second discount basis.

5. The method of claim 1 further comprising sending the output data to an enterprise resource planning (ERP) system.

6. A computer system comprising:
one or more processors; and
a non-transitory computer readable medium having stored thereon one or more programs, which when executed by the one or more processors, causes the one or more processors to:
receive, in a software defined network, configuration information comprising one or more category codes and at least one location code corresponding to one or more transactions on the software defined network, wherein the location code specifies a geographic region of a transaction from a predetermined set of geographic regions, and wherein the category codes correspond to region specific operations, and wherein the software defined network stores a plurality of category codes and a plurality of location codes as user specified tuples, each tuple comprising one category code and an associated one location code;
receive, in the software defined network, a plurality of electronic documents each comprising a plurality of data fields, the data fields comprising a category code, a location code, and input data, wherein at least some of the plurality of electronic documents differ in which of the plurality of data fields the category code and the location code are held;
access, in the software defined network, the configuration information, and in accordance therewith, identifying location specific mapping operators for each electronic document based on each electronic document's category code and location code corresponding to specific ones of the user specified tuples for transforming the input data in the plurality of data fields into output data, the location specific mapping operators are configured to apply respective adjustments to the input data of the each electronic document for said transforming;
execute, in the software defined network, the location specific mapping operators on the input data to produce output data that reflects the respective adjustments; and
send, by the software defined network to a client device, a communication based upon the output data indicating at least one of the respective adjustments.

7. The computer system of claim 6 wherein accessing the configuration information and executing the location specific mapping operators comprises:
for a first electronic document,
accessing a first category code and a first location code;
performing a first location specific operation corresponding to the first category code and the first location code on a first data field of the second plurality of data fields; and
for a second electronic document,
accessing a second category code and a second location code;
performing a second location specific operation corresponding to the second category code and the second location code on a second data field of the second plurality of data fields,
wherein the first data field is not in the second electronic document and the second data field is not in the first electronic document.

8. The computer system of claim 6 wherein the electronic documents are extended markup language (XML) documents.

9. The computer system of claim 8 wherein the XML documents comprise:
a data field in the first plurality of data fields storing a total amount due including tax;
for a first XML document,
a second data field in the second plurality of data fields storing a first category code corresponding to a first tax category;
a third data field in the second plurality of data fields storing a first location code corresponding to a first tax location; and
a fourth data field in the second plurality of data fields storing a first discount basis; and
for a second XML document,
the second data field in the second plurality of data fields storing a second category code corresponding to a second tax category;
the third data field in the second plurality of data fields storing a second location code corresponding to a second tax location; and
the fourth data field in the second plurality of data fields storing a second discount basis.

10. A non-transitory computer readable storage medium storing one or more programs, the one or more programs comprising instructions for:
receiving, in a software defined network, configuration information comprising one or more category codes and at least one location code corresponding to one or more transactions on the software defined network, wherein the location code specifies a geographic region of a transaction from a predetermined set of geographic regions, and wherein the category codes correspond to region specific operations, and wherein the software defined network stores a plurality of category codes and a plurality of location codes as user specified tuples, each tuple comprising one category code and an associated one location code;
receiving, in the software defined network, a plurality of electronic documents each comprising a plurality of data fields, the data fields comprising a category code, a location code, and input data, wherein at least some of the plurality of electronic documents differ in which of the plurality of data fields the category code and the location code are held;
accessing, in the software defined network, the configuration information, and in accordance therewith, identifying location specific mapping operators for each electronic document based on each electronic document's category code and location code corresponding to specific ones of the user specified tuples for transforming the input data in the plurality of data fields into output data, the location specific mapping operators are configured to apply respective adjustments to the input data of the each electronic document for said transforming;
executing, in the software defined network, the location specific mapping operators on the input data to produce output data that reflects the respective adjustments; and
sending, by the software defined network to a client device, a communication based upon the output data indicating at least one of the respective adjustments.

11. The non-transitory computer readable medium of claim 10 wherein accessing the configuration information and executing the location specific mapping operators comprises:
for a first electronic document,
accessing a first category code and a first location code;
performing a first location specific operation corresponding to the first category code and the first location code on a first data field of the second plurality of data fields; and
for a second electronic document,
accessing a second category code and a second location code;
performing a second location specific operation corresponding to the second category code and the second location code on a second data field of the second plurality of data fields,
wherein the first data field is not in the second electronic document and the second data field is not in the first electronic document.

12. The non-transitory computer readable medium of claim 10 wherein the electronic documents are extended markup language (XML) documents and wherein the XML documents comprise:
a data field in the first plurality of data fields storing a total amount due including tax;
for a first XML document,
a second data field in the second plurality of data fields storing a first category code corresponding to a first tax category;
a third data field in the second plurality of data fields storing a first location code corresponding to a first tax location; and
a fourth data field in the second plurality of data fields storing a first discount basis; and
for a second XML document,
the second data field in the second plurality of data fields storing a second category code corresponding to a second tax category;
the third data field in the second plurality of data fields storing a second location code corresponding to a second tax location; and
the fourth data field in the second plurality of data fields storing a second discount basis.

* * * * *